(12) United States Patent
Kawamoto et al.

(10) Patent No.: US 11,003,197 B2
(45) Date of Patent: May 11, 2021

(54) FLOW RATE CONTROL DEVICE

(71) Applicant: TOFLO CORPORATION, Hino (JP)

(72) Inventors: Takahiro Kawamoto, Hino (JP); Takuo Shimada, Hino (JP); Shinji Tobimatsu, Hino (JP); Tetsuaki Sekine, Hino (JP)

(73) Assignee: TOFLO CORPORATION, Tokyo (JP)

(*) Notice: Subject to any disclaimer, the term of this patent is extended or adjusted under 35 U.S.C. 154(b) by 0 days.

(21) Appl. No.: 16/645,128

(22) PCT Filed: Sep. 7, 2017

(86) PCT No.: PCT/JP2017/032376
§ 371 (c)(1),
(2) Date: Mar. 6, 2020

(87) PCT Pub. No.: WO2019/049292
PCT Pub. Date: Mar. 14, 2019

(65) Prior Publication Data
US 2020/0278705 A1 Sep. 3, 2020

(51) Int. Cl.
*G05D 7/06* (2006.01)
*F16K 37/00* (2006.01)

(52) U.S. Cl.
CPC ....... *G05D 7/0635* (2013.01); *F16K 37/0041* (2013.01); *G05D 7/0652* (2013.01)

(58) Field of Classification Search
CPC .......... F16K 37/0041; G05D 7/0635
See application file for complete search history.

(56) References Cited

U.S. PATENT DOCUMENTS 6,994,309 B2 * 2/2006 Fernandez-Sein ........................... F16K 37/0091
251/129.04
8,307,845 B2 * 11/2012 Kouchi ................... G01F 1/363
137/486

FOREIGN PATENT DOCUMENTS

JP   H5-84747 A     4/1993
JP   2017-174428 A  9/2017

* cited by examiner

*Primary Examiner* — Eric Keasel
(74) *Attorney, Agent, or Firm* — Muncy, Geissler, Olds & Lowe, P.C.

(57) ABSTRACT

An object is to provide a flow rate control device that can suppress a manufacturing cost and greatly reduce burdens of setting and maintenance.
A flow rate control device 11 of the invention is comprised with a flow rate adjusting valve 21 that is installed in a flow path 13, a flow rate measurement part 41 that measures a flow rate of a fluid flowing through the flow path 13, a controller 61 that controls opening degrees of the flow rate adjusting valve 21 based on a measurement result of the flow rate measurement part 41, and a pressure deficiency detecting function that detects pressure deficiency when a limit sensor 246 (an opening detecting sensor) that detects the opening of the flow rate adjusting valve 21 detects the opening degrees are full. With the structure, it becomes possible, compared with a conventional system to detect a pressure deficiency using a pressure sensor, to suppress a manufacturing cost and greatly reduce burdens of setting and maintenance and to notify of pressure deficiency at a necessary timing in an early stage before an abnormality occurs due to a flow rate decrease.

6 Claims, 4 Drawing Sheets

(1)

FLOW RATE CONTROL DEVICE

TECHNICAL FIELD

This invention relates to a flow rate control device that adjusts the opening degrees of a flow rate adjusting valve based on the measurement result of a flow rate measurement part.

BACKGROUND

For example, disclosed in Patent Document 1 is a technique to control the flow of a fluid flowing in a circuit by connecting between a fluid temperature adjusting machine and a switching manifold with a pipe and switching the open/close of an electromagnetic switching valve embedded in the switching manifold.

RELATED ART

Patent Document(s)

[Patent Doc. 1] JP Laid-Open Patent Application Publication H5-84747

SUMMARY OF INVENTION(S)

Subject(S) to be Solved

By the way, among flow rate control devices, known is one having a flowmeter, a flow rate adjusting valve, and a control device built in. In such a flow rate control device, pressure deficiency inside a pipe is usually detected by a pressure sensor, and a measure such as outputting an alarm is taken if the pressure becomes a certain value or lower. However, there occurs a problem that if the pipe is clogged somewhere, pressure alone cannot detect such a situation that there is no flow rate although sufficient pressure is supplied. In order to dissolve this problem, although installing pressure sensors in various places in the pipe can be considered, there is a problem that the installation work is troublesome and further the manufacturing cost greatly increases.

Then, this invention has been made considering the above-mentioned situation, having an objective to offer a flow rate control device that can suppress the manufacturing cost and greatly reduce the burdens of setting and maintenance.

Means to Solve the Subject(S)

In order to solve the above subject(s), a flow rate control device of the invention includes a flow rate adjusting valve that is installed in a flow path, a flow rate measurement part that measures a flow rate of a fluid flowing through the flow path, a controller that controls opening degrees of the flow rate adjusting valve based on a measurement result of the flow rate measurement part, and a pressure deficiency detecting function that detects pressure deficiency when an opening detecting sensor that detects the opening of the flow rate adjusting valve detects the opening degrees are full.

The flow rate control device of the invention may include a valve life notifying function that notifies of a life end of the flow rate adjusting valve when an accumulated operation amount of the flow rate adjusting valve has reached a predetermined setting value.

The flow rate control device of the invention may include an internal leak notifying function that notifies of a leak of a liquid inside the flow rate adjusting valve when a flow amount is a predetermined setting value or greater even though the flow rate adjusting valve has been fully closed.

The flow rate control device of the invention may include a flowmeter life notifying function that notifies of a life end of the flow rate measurement part when an accumulated rotation number of an impeller in the flow rate measurement part has reached a predetermined setting value.

The flow rate control device of the invention may include an LED that emits light in a pattern corresponding to each of individual functions of the pressure deficiency detecting function, the valve life notifying function, the internal leak notifying function, and the flowmeter life notifying function.

Advantage(S) of Invention(S)

According to the flow rate control device of this invention, by having a pressure deficiency detecting function to detect pressure deficiency when an opening detecting sensor of a flow rate adjusting valve has detected the opening fully opened (or the valve is fully opening), the manufacturing cost can be greatly reduced in comparison with the conventional method of detecting a pressure abnormality with a pressure sensor, and it becomes possible to notify of pressure deficiency at a necessary timing in an early stage before an abnormality occurs due to a flow rate decrease. Therefore, even when an abnormality has occurred, it becomes possible to clean pipes and filters at a convenient timing without abnormal-halting the device or equipment for a reasonable length of time, greatly reducing the burden of setting and maintenance.

BRIEF DESCRIPTION OF THE DRAWINGS

FIG. 4A is a cross-sectional view of a housing, and FIG. 4B is an arrow view of B-B of a motor actuator.

DETAILED DESCRIPTION OF THE INVENTION(S)

An embodiment of this invention is explained referring to attached drawings. Note that for convenience, the left-right (direction) in FIG. 1 is defined as the front-back of a flow rate control unit 1, the left-right (direction) in FIG. 2 as the left-right of the flow rate control unit 1, and the up-down (direction) in FIGS. 1 through 3 as the up-down of the flow rate control unit 1 or flow rate control devices 11.

Figure 1:
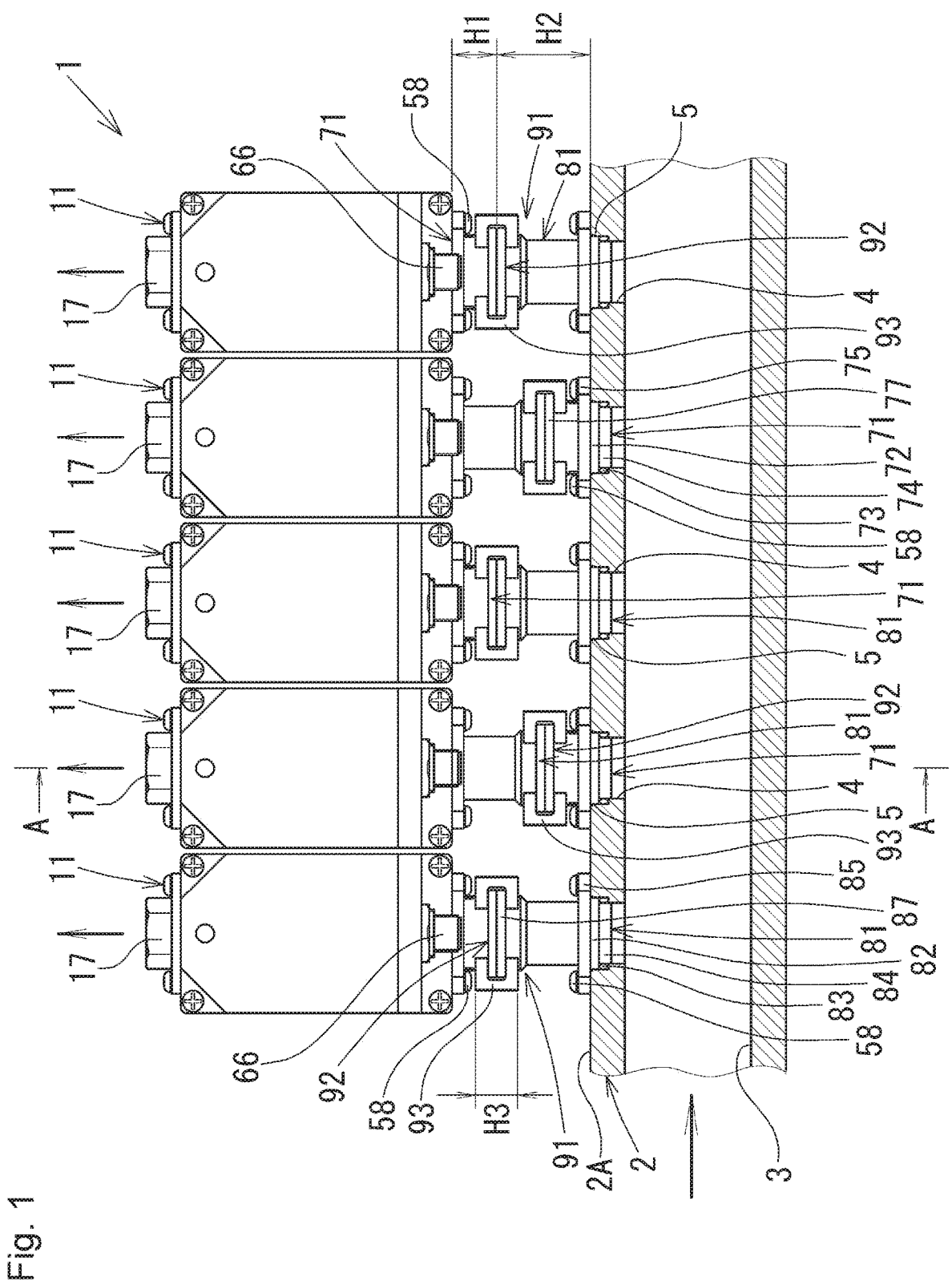
FIG. 1 is a diagram showing part of a front view of a flow rate control unit of this embodiment, especially showing a manifold in a cross-sectional view.
Figure 2:
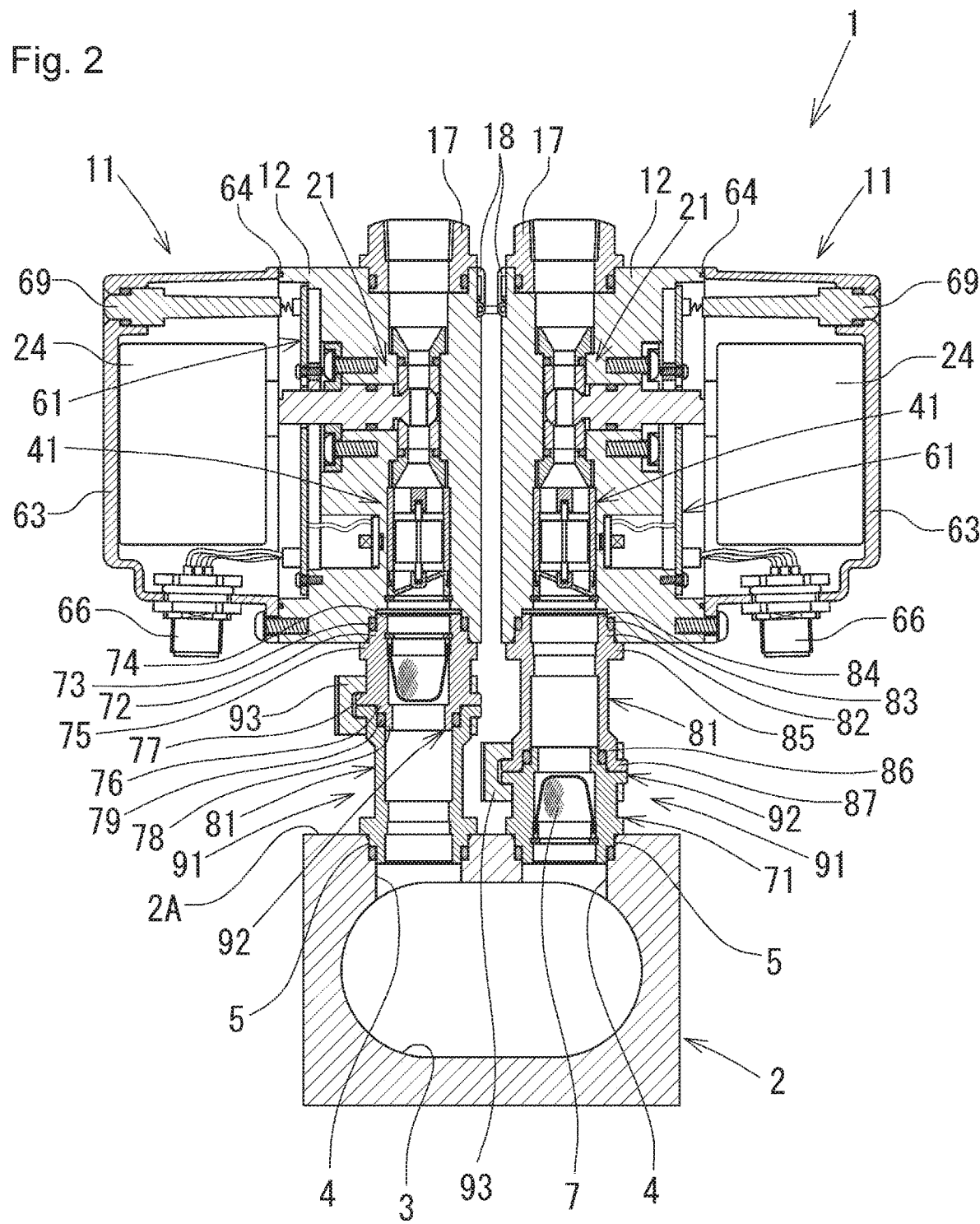
FIG. 2 is an arrow view of A-A in FIG. 1.

As shown in FIGS. 1 and 2, the flow rate control unit 1 is provided with a manifold 2 formed in an approximate rectangular parallelepiped extending in the front-back direction, a plurality of flow rate control devices 11 mounted juxtaposedly on the manifold 2, and joints 91 (connection means) that connect the manifold 2 and the flow rate control devices 11

(Manifold)

The manifold 2 has a cavity 3 that extends in the front-back direction inside the manifold 2, and an introduction port (not shown) that is installed on the lower part of the manifold 2 and introduces a fluid ("water" in this embodiment) that went through a strainer (not shown) to the cavity 3. Also, the manifold 2 has a plurality of ports 4 that open to the upper face 2A of the manifold 2 and communicate with the cavity 3.

As shown in FIG. 2, the ports 4 are arranged in two rows with a constant interval in the left-right direction. Also, as shown in FIG. 1, the ports 4 in each row are arranged with constant intervals in the front-back direction. In other words, the ports 4 are arranged in a grid shape elongated in the front-back direction. Note that formed on the opening of each of the ports 4 is a connection port 5 having a larger inner diameter than the inner diameter of the port 4. Also, adopted as the material of the manifold 2 is plastic or non-magnetic metal.

(Flow Rate Control Device)

Figure 3:
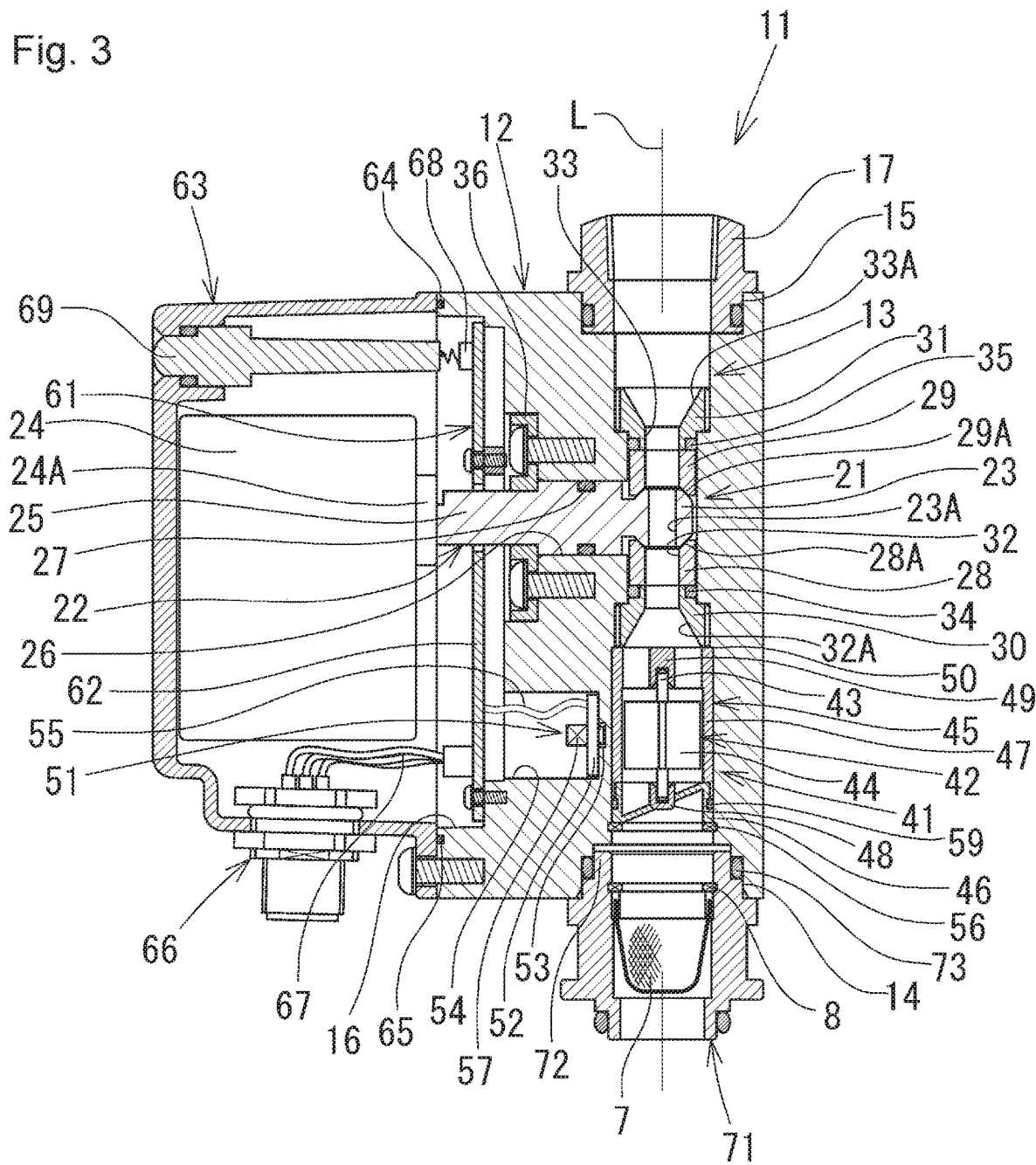
FIG. 3 is a diagram showing an enlarged view of the left-side flow rate control device in FIG. 2.

As shown in FIG. 3, the flow rate control device 11 has a body 12 made of plastic or non-magnetic metal, and a flow path 13 that extends in the up-down direction inside the body 12 where a fluid flows upwards. The body 12 has an inflow port 14 that opens on the lower end of the body 12 where a below-mentioned joint 91 (connection means) is connected, and an outflow port 15 that opens on the upper end of the body 12 where an adapter 17 is connected (fitted). Here, for convenience, flow paths from the inflow port 14 to the outflow port 15 of the body 12 are collectively called the flow path 13. Note that formed on the adapter 17 is a taper pipe thread for connecting a pipe connector.

(Flow Rate Adjusting Valve)

The flow rate control device 11 is provided with a flow rate adjusting valve 21 constituted of a ball valve mechanism. The flow rate adjusting valve 21 has a valve element 22 provided with a shaft part 25 and a ball part 23 that is installed on the tip (right end in FIG. 3) of the shaft part 25 and can block the flow path 13. The base end (left end in FIG. 1) of the shaft part 25 is connected to a rotation shaft 24A of a motor actuator 24. Formed on the body 12 is an axial hole 26 that penetrates the body 12 in the horizontal direction (left-right direction in FIG. 3) and communicates with the flow path 13. The shaft part 25 of the valve element 22 is fitted slidably into the axial hole 26. Note that space between the shaft part 25 of the valve element 22 and the axial hole 26 of the body 12 is sealed with an O-ring 27. Also, the motor actuator 24 comprises a stepping motor, a deceleration mechanism, and a position detecting sensor.

The flow rate adjusting valve 21 has a pair of ball packings 28 and 29 disposed in the upstream side and the downstream side of the flow path 13 sandwiching the ball part 23 of the valve element 22. The ball packing 28 in the upstream side is pressed toward the downstream side (upper side in FIG. 3) with a fixing nut 30, thereby the valve seat part 28A closely contacts the ball part 23 in a slidable manner. Also, the ball packing 29 in the downstream side is pressed toward the upstream side (lower side in FIG. 3) with a fixing nut 31, thereby a valve seat part 29A closely contacts the ball part 23 in a slidable manner. Here, what is shown in FIG. 3 is a state where the flow rate adjusting valve 21 is fully open, and in this state the axial line of a flow path 23A of the ball part 23 of the valve element 22 coincides with the axial line of a flow path 32 that extends penetrating the ball packing 28 and the fixing nut 30 and the axial line of a flow path 33 that extends penetrating the ball packing 29 and the fixing nut 31, and further coincides with the axial line L of the flow path 13.

Note that the flow path 32 has a diameter-reducing part 32A whose flow path area is gradually reduced on the end part in the opposite side (lower side in FIG. 3) of the ball part 23 side (valve seat part 28A side). Also, the flow path 33 has a diameter-expanding part 33A whose flow path area is gradually expanded on the end part in the opposite side (upper side in FIG. 3) of the ball part 23 side (valve seat part 29A side). Also, space between the fixing nut 30 and the flow path 13 is sealed with an O-ring 34. Also, space between the fixing nut 31 and the flow path 13 is sealed with an O-ring 35. Furthermore, indicated with a code 36 in FIG. 3 is a retaining plate that prevents the valve element 22 from moving in the axial line direction (left-right direction in FIG. 3) relative to the axial hole 26.

(Flow Rate Measurement Part)

The flow rate control device 11 is provided with a flow rate measurement part 41 that indirectly measures the flow rate of a fluid flowing in the upstream side (lower side in FIG. 3) of the flow rate adjusting valve 21 based on the rotation rate of a below-mentioned impeller 42. The flow rate measurement part 41 is so-called an impeller (turbine) type flowmeter, having an impeller 42, and a supporting frame 45 that rotatably supports the impeller 42. The impeller 42 has a rotation shaft 43 disposed on the axial line L (see FIG. 3) of the flow path 13, and a plurality of ("four" in this embodiment) wing parts 44 (turbine blades) installed with equal intervals around the rotation shaft 43. Then, adopted in manufacturing the impeller 42 in this embodiment is metal injection molding (MIM) having non-magnetized magnetic metal powder as the material, forming the rotation shaft 43 and the plurality of wing parts 44 (simultaneously) in one body. Note that adopted as the material (magnetic body) for metal injection molding is magnetic stainless steel (e.g., SUS 630) for example.

As shown in FIG. 3, the supporting frame 45 is configured divided into a rotational-flow plate 46 that makes a passing fluid generate a rotational flow, and a sleeve 47 that surrounds the wing parts 44 of the impeller 42. The rotational-flow plate 46 is made of plastic or non-magnetic metal, and has a shaft bearing part 48 installed in the center to support the lower end of the rotation shaft 43 of the impeller 42. The sleeve 47 is made of plastic or non-magnetic metal, and has a shaft bearing part 49 installed in the center to support the upper end of the rotation shaft 43 of the impeller 42. Note that the supporting frame 45 (sleeve 47) is positioned in the up-down direction, that is, the direction along the axial line L of the flow path 13 by its upper end abutting a step part 50 formed in the flow path 13. Also, the supporting frame 45 (rotational-flow plate 46) is prevented from moving downwards (toward the upstream side) by a C-shaped retaining ring 56 attached to the inner circumference of the flow path 13.

On the other hand, the flow rate measurement part 41 is provided with a sensor unit 51 that measures the rotation rate of the impeller 42. The sensor unit 51 comprises a sensor board 52, a GMR (Giant Magnetoresistance) sensor 53 mounted on the sensor board 52, and a bias magnet 57 (e.g., ferritic bulk magnet) that applies a bias magnetic field to the GMR sensor 53. The sensor board 52 is accommodated by a sensor unit accommodation part 54 that extends from a recessed part 16 of the body 12 toward the impeller 42 disposed inside the flow path 13. Then, the sensor unit 51 measures the rotation rate of the impeller 42 based on variation in the magnetic field intensity accompanying the rotation of the impeller 42 detected by the GMR sensor 53, and outputs a pulse signal (called "rotation rate signal" for convenience) corresponding to the measurement result to a controller 61 mentioned below.

Note that in this embodiment the GMR sensor 53 has a Wheatstone bridge configured by two GMR elements disposed on the sensor board 52 with an interval in the rotation direction of the impeller 42 (front-back direction) so as to detect variation in the magnetic field intensity based on variation in the resistance value of the two GMR elements. Also, indicated with a code 55 in FIG. 3 is a signal cable that connects the sensor board 52 and a control board 62 of the controller 61. Furthermore, indicated with a code 59 in FIG. 3 is an O-ring that seals space between the rotational-flow plate 46 and the sleeve 47.

(Controller)

The flow rate control device 11 is provided with the controller 61 that feedback-controls to control the opening degrees of the flow rate adjusting valve 21 based on the measurement result (rotation rate of the impeller 42) of the flow rate measurement part 41 mentioned above. The controller 61 is so-called a microcomputer provided with an arithmetic part, a memory part, etc., and performs a feedback control (PID control) of the opening of the flow rate adjusting valve 21 based on the rotation rate signal (flow rate measured by the flow rate measurement part 41) outputted from the flow rate measurement part 41. That is, the controller 61 converts the rotation rate signal into the measured value of the flow rate, in other words, converts the rotation rate into the flow rate based on a data table, and arithmetically processes the measured value (flow rate measured value) and a setting value (flow rate target value). Then, it is configured so that by controlling the motor actuator 24 based on the arithmetic processing result, the valve element 22 and further the ball part 23 are rotated to adjust the flow rate of a fluid flowing through the flow path 13.

The controller 61 has the control board 62 accommodated in the recessed part 16 formed on a side face (left side face in FIG. 3) of the body 12. Installed on a side face of the body 12 is a housing 63 made of an aluminum alloy that accommodates the motor actuator 24, and space between the housing 63 and the recessed part 16 is tightly sealed with a packing 64. Note that the packing 64 is fit in a packing groove 65 formed on the peripheral edge of the recessed part 16 of the body 12. Also, installed on the lower part of the housing 63 is a water-proof connector 66 used for communication ("RS485" in this embodiment) with the outside. Also, the water-proof connector 66 and the control board 62 are connected with a signal cable 67 ("5 core" in this embodiment). Also, indicated with a code 68 in FIG. 3 is an LED (full-color) mounted on the control board 62. Furthermore, indicated with a code 69 in FIG. 3 is an optical transmission window made of a transparent resin for visually recognizing the LED 68 from the outside.

(Connection Means)

As shown in FIG. 2, the joint 91 (connection means) is formed of a linear pipe body, and has a joint adapter 71 (first pipe member) and a joint adapter 81 (second pipe member) dividable in the axial line direction (up-down direction). Formed on the base end of the joint adapter 71 is a first end part 72 that can be connected to the connection port 5 of each of the ports 4 of the manifold 2 and the inflow port 14 of the flow rate control device 11. Then, the joint adapter 71 is connected to the manifold 2 by inserting the first end part 72 (shaft) to the connection port 5 (hole) of the port 4, and is connected to the flow rate control device 11 by inserting the first end part 72 (shaft) to the inflow port 14 (hole) of the flow rate control device 11 on the other hand. In other words, the connection port 5 of each of the ports 4 of the manifold 2 and the inflow port 14 of the flow rate control device 11 are formed in the same shape (having the same inner diameter).

Note that formed on the tip of the first end part 72 of the joint adapter 71 is a small-diameter part 74 for attaching an O-ring 73, and space between the first end part 72 of the joint adapter 71 and the connection port 5 of each of the ports 4 of the manifold 2 or the inflow port 14 of the flow rate control device 11 is sealed with the O-ring 73. Also, installed inside the joint adapter 71 is a filter 7 for capturing foreign matters contained in a fluid passing through the joint adapter 71. Furthermore, indicated with a code 8 in FIG. 3 is a C-shaped retaining ring that prevents the filter 7 from moving in the axial line direction (up-down direction) relative to the joint adapter 71.

On the other hand, formed on the base end of the joint adapter 81 is a first end part 82 in the same shape as the first end part 72 of the joint adapter 71 mentioned above. That is, the joint adapter 81 is connected to the manifold 2 by inserting the first end part 82 (shaft) to the connection port 5 (hole) of the port 4, and is connected to the flow rate control device 11 by inserting the first end part 82 (shaft) to the inflow port 14 (hole) of the flow rate control device 11 on the other hand. Note that formed on the tip of the first end part 82 of the joint adapter 81 is a small-diameter part 84 for attaching an O-ring 83, and space between the first end part 82 of the joint adapter 81 and the connection port 5 of each of the ports 4 of the manifold 2 or the inflow port 14 of the flow rate control device 11 is sealed with the O-ring 83.

Then, the joint adapter 71 (81) is positioned in the axial line direction (up-down direction) relative to the flow rate control device 11 by a first flange 75 (85) formed on the outer circumference of the first end part 72 (82) abutting the lower end face of the body 12 of the flow rate control device 11. Also, the joint adapter 71 (81) is attached to the flow rate control device 11 by fixing the first flange 75 (85) to the body 12 with a screw 58 (see FIG. 1). On the other hand, the joint adapter 71 (81) is positioned in the axial line direction (up-down direction) relative to the manifold 2 by the first flange 75 (85) formed on the outer circumference of the first end part 72 (82) abutting the upper end face of the manifold 2. Also, the joint adapter 71 (81) is attached to the manifold 2 by fixing the first flange 75 (85) to the manifold 2 with the screw 58.

Then, the joint 91 inserts a second end part 76 (shaft) formed on the tip of the joint adapter 71 (first pipe member) to a second end part 86 (hole) formed on the tip of the joint adapter 81 (second pipe member), thereby the joint adapter 71 and the joint adapter 81 are coupled, and as the result the flow rate control device 11 is connected to the manifold 2. Note that formed on the tip of the second end part 76 of the joint adapter 71 is a small-diameter part 78 for attaching an O-ring 79, and space between the second end part 76 of the joint adapter 71 and the second end part 86 of the joint adapter 81 is sealed with the O-ring 79.

As shown in FIGS. 1 and 2, the joint 91 has a second flange 77 formed on the outer circumference of the joint adapter 71 and a second flange 87 formed on the outer circumference of the joint adapter 81 in contact with each other. Thereby, the joint adapter 71 and the joint adapter 81 are relatively positioned in the axial line direction (up-down direction). Also, the joint 91 prevents the joint adapter 71 and the joint adapter 81 from moving relatively in the axial line direction (up-down direction) by attaching a metallic clip 93 over the coupling part 92 between the second flange 77 and the second flange 87 superimposed on each other. Note that a commercially-available metallic fastener can be used as the clip 93. Also, adopted as the material of the joint adapter 71 and the joint adapter 81 is plastic or metal.

As shown in FIGS. 1 and 2, the joint adapter 71 and the joint adapter 81 of the joint 91 are different in the axial line direction length. Here, the axial line direction length of the joint adapter 71 is a distance from the mounting face of the first flange 75 to the coupling face of the second flange 77 (H1 in FIG. 1). On the other hand, the axial line direction length of the joint adapter 81 is a distance from the mounting face of the first flange 85 to the coupling face of the second flange 87 (H2 in FIG. 1). Note that the axial line direction length of the joint adapter 81 (H2) is determined to be the sum of the axial line direction length of the joint adapter 71 (H1) and the thickness of the clip 93 (H3 in FIG. 1) or greater (H2≥H1+H3).

Then, as shown in FIG. 1, the flow rate control unit 1 has the joints 91 arranged on the manifold 2 so that the orientations of the joints 91 of the flow rate control devices 11 adjacent in the front-back direction (left-right direction in FIG. 1) alternate (up and down reversed). In other words, the joints 91 are arranged on the manifold 2 so that the joint adapter 71 (first pipe member) and the joint adapter 81 (second pipe member) alternate between the joints 91 adjacent in the front-back direction. In the same manner, as shown in FIG. 2, the flow rate control unit 1 has the joints 91 arranged on the manifold 2 so that the orientations of the joints 91 of the flow rate control devices 11 adjacent in the left-right direction (left-right direction in FIG. 2) alternate. In other words, the joints 91 are arranged on the manifold 2 so that the joint adapter 71 and the joint adapter 81 alternate between the joints 91 adjacent in the left-right direction.

Therefore, as shown in FIGS. 1 and 2, the flow rate control unit 1 has different positions (heights from the upper face of the manifold 2) of the coupling parts 92 of the joint adapter 71 and the joint adapter 81, that is the positions of the clips 93, between the joints 91 of the flow rate control devices 11 adjacent in the front-back direction and in the left-right direction. Note that indicated with a code 18 in FIG. 2 is a coupler that is installed on the upper part of each of the flow rate control devices 11 for coupling the flow rate control devices 11 adjacent in the left-right direction (back to back) on the manifold 2. Here, shown in FIG. 2 is a state before bridging the coupler 18, that is, an uncoupled state between the flow rate control devices 11 adjacent back to back.

(Actions)

The actions of the above-mentioned flow rate control unit 1 are explained.

First of all, when mounting the flow rate control devices 11 juxtaposedly on the manifold 2, the first end part 72 of the joint adapter 71 (first pipe member) or the first end part 82 of the joint adapter 81 (second pipe member) is connected to the connection port 5 of each of the ports 4 of the manifold 2 in advance. At this time, the joint adapter 71 and the joint adapter 81 are arranged so that the joint adapters 71 (81) adjacent in the front-back direction (left-right direction in FIG. 1) and in the left-right direction (left-right direction in FIG. 2) alternate, that is, lest the same kind of joint adapters 71 (81) be adjacent to each other.

On the other hand, in the flow rate control device 11, the flow rate control device 11 where the first end part 72 of the joint adapter 71 (first pipe member) is connected to the inflow port 14, and the flow rate control device 11 where the first end part 82 of the joint adapter 81 (second pipe member) is connected to the inflow port 14 are prepared. Then, each of the flow rate control devices 11 is attached to the manifold 2 so as to have the joint adapter 71 and the joint adapter 81 coupled. Thereby, the joints 91 adjacent in the front-back direction and in the left-right direction on the manifold 2 alternate up and down, in other words, the positions (heights) of the couplers 92 alternate.

In this state, by attaching the clip 93 to the coupling part 92 of each of the joints 91, the coupling between the joint adapter 71 and the joint adapter 81 is held, and further the connection of each of the flow rate control devices 11 to the manifold 2 is held. Also, the flow rate control devices 11 adjacent in the left-right direction is coupled by bridging the coupler 18 of one of the flow rate control devices 11 to the coupler 18 of the other flow rate control device 11. Note that the timing to attach the clip 93 and the timing to bridge the coupler 18 are arbitrary. Also, when removing one of the flow rate control devices 11 from the manifold 2, by removing the clip 93 and releasing the coupling with the coupler 18, an arbitrary flow rate control device 11 can be simply removed (pulled out) from the manifold 2.

(Flow Rate Control)

First, once a fluid ("water" in this embodiment) is introduced to the manifold 2 by a fluid supply means (such as "pump"), the fluid is supplied to each of the flow rate control devices 11 via each of the ports 4 of the manifold 2 and each of the joints 91. The fluid introduced to each of the flow rate control devices 11, that is, the fluid flowing through the flow path 13 of each of the flow rate control devices 11 becomes a rotational flow and rotates the impeller 42 of the flow rate measurement part 41.

Then, in each of the flow rate control devices 11, in the flow rate measurement part 41, variation in the magnetic field intensity accompanying the rotation of the impeller 42 is detected by the GMR sensor 53, and the rotation rate of the impeller 42 is measured based on the variation in the magnetic field intensity. The rotation rate signal (pulse signal) as the result of measuring the flow rate by the flow rate measurement part 41 is outputted to the controller 61. The controller 61 converts the received rotation rate signal into the flow rate (flow rate measured value) of the fluid flowing through the flow path 13.

Furthermore, the controller 61 performs an arithmetic processing (PID processing) of the flow rate measured value and a flow rate control signal (flow rate target value) received via the signal cable 67 of the water-proof connector 66 from an external control device (not shown), and outputs the control signal (motor control signal) as the arithmetic processing result to the motor actuator 24. Thereby, the motor actuator 24 operates based on the motor control signal. Thereby, the opening degrees of the flow rate adjusting valve 21 (ball valve), that is, the flow path area of the flow path 13 is adjusted, and further the flow rate of the fluid flowing through the flow path 13 is adjusted.

(Pressure Deficiency Detecting Function) Then, the flow rate control device 11 has a pressure deficiency detecting function that detects pressure deficiency inside the flow path 13. The pressure deficiency detecting function detects pressure deficiency when an opening detecting sensor (such as a limit sensor or a potentiometer) of the flow rate adjusting valve 21 (ball valve) installed in the motor actuator 24 has detected a 100% opening degrees (full open). The pressure deficiency can be visually recognized through the optical transmission window 69 of the housing 63, that is, by the light emission pattern of the LED 68.

Figure 4A:
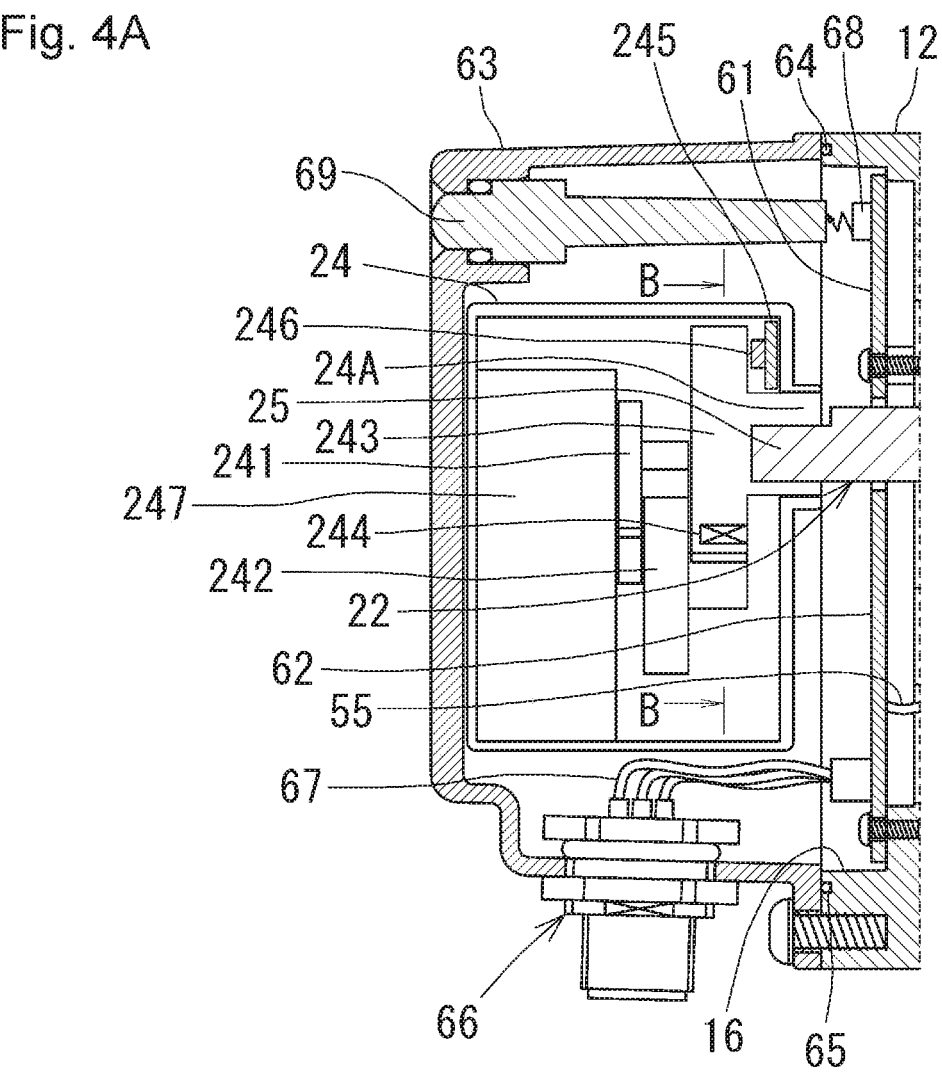
FIGS. 4A and 4B are enlarged views of part of the flow rate control device in FIG. 3, where
Figure 4B:
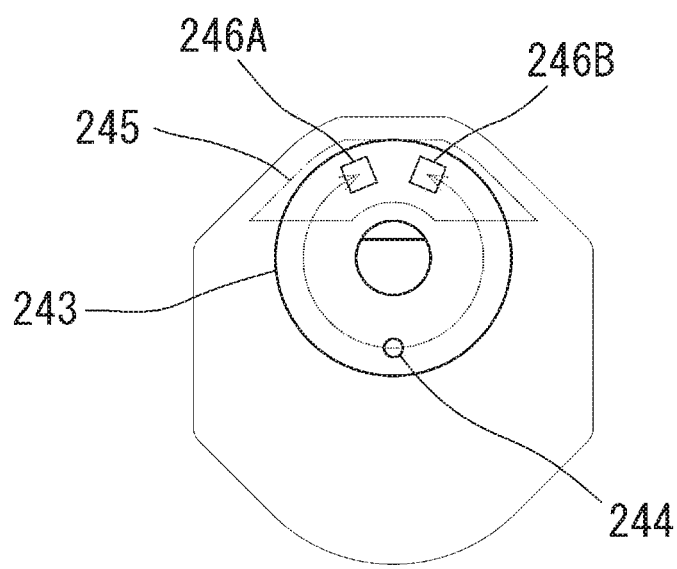

Here, the pressure deficiency detecting function is further explained in detail. As shown in FIG. 4, the motor actuator 24 has multiple stages of gears 241, 242, and 243, among which the last-stage gear 243 has a magnet 244 inserted. Also, in this embodiment, a limit sensor 246 mounted on a board 245 is installed inside, configured so that corresponding to the last-stage gear 243 rotating over the range from full close to full open (0-315°), a limit sensor 246A in the full-close side and a limit sensor 246B in the full-open side detect the magnet 244 and stop the operation of a motor 247 through the controller 61 in order to prevent excessive closing or excessive opening.

That is, if the valve opening (or opening degrees) reaches full open during a control (detected by the limit sensor 246B in the full-open side), the opening degrees of the flow rate adjusting valve 21 cannot be adjusted toward allowing any higher flow rate, that is, an adjustment margin has reached its limit. Thereby, pressure is insufficient for allowing a preset flow rate value, and it can be judged that the pressure is deficient in an early stage.

Also, because a pressure loss of a pipe increases if the flow path has accumulated scale etc., if it is operated for a long period of time, its pressure becomes insufficient, and even if the operation is performed by increasing a supplied pressure having a margin in advance, it cannot be judged how long it may last before reaching its limit. Therefore, generally adopted is a method that a flow rate sensor is installed, and having a certain flow rate or lower is regarded as a pressure abnormality. However, in the case of this method, a flow rate abnormality (such as a flowmeter abnormality or a momentary pressure decrease) and pressure deficiency cannot be distinguished.

As opposed to this, according to a method that pressure deficiency is detected with a limit sensor 246 as in this embodiment, it becomes possible to notify of pressure deficiency at a necessary timing in an early stage before an abnormality occurs due to a flow rate decrease. Therefore, even when an abnormality has occurred, it becomes possible to clean pipes and filters at a convenient timing without abnormal-halting the device or equipment for a reasonable length of time, greatly reducing the burdens of setting and maintenance. Note that in this embodiment, because pressure deficiency is detected when the limit sensor 246 has detected full open continuously for a certain length of time, a flow rate abnormality due to a momentary pressure decrease is rejected as noise instead of pressure deficiency.

(Valve-Related Notifying Function) Also, the flow rate control device 11 has a valve life notifying function that notifies of the life end of the O-ring 27 used for the flow rate adjusting valve 21, and further the life end of the flow rate adjusting valve 21 (ball valve). In the flow rate control device 11, the accumulated operation amount of the flow rate adjusting valve 21 is stored in nonvolatile memory of the controller 61, and once the accumulated operation amount of the flow rate adjusting valve 21 reaches a predetermined setting value, the valve life notifying function judges that the O-ring 27 has come to the life end (replacement time). Note that the O-ring 27 having the life end can be visually recognized through the optical transmission window 69 of the housing 63, that is, by the light emission pattern of the LED 68. Also, the accumulated operation amount of the flow rate adjusting valve 21 at the present time can be found by utilizing a communication function with an external terminal.

(Flowmeter-Related Notifying Function) Also, the flow rate control device 11 has a flowmeter life notifying function that notifies of the life end of the impeller 42 used in the flow rate measurement part 41, and further the life end of the flow rate measurement part 41 (flowmeter). In the flow rate control device 11, the rotation number of the impeller 42 is counted and stored in the nonvolatile memory of the controller 61, and by the accumulated rotation number of the impeller 42 reaching a predetermined setting value, the flowmeter life notifying function judges that the flowmeter has come to the life end. Note that the flowmeter coming to the life end can be visually recognized through the optical transmission window 69 of the housing 63, that is, by the light emission pattern of the LED 68.

(Internal Leak Notifying Function) Also, the flow rate control device 11 has an internal leak notifying function that notifies of a fluid leak (water leak) inside the flow rate adjusting valve 21. The internal leak notifying function judges that an internal leak has occurred if in spite of having the flow rate adjusting valve 21 fully closed, the fluid has flowed by a certain flow amount or greater during a certain length of time, in other words, if the rotation number of the impeller 42 of the flow rate measurement part 41 over a certain length of time is a certain value or higher. Note that the occurrence of an internal leak can be visually recognized through the optical transmission window 69 of the housing 63, that is, by the light emission pattern of the LED 68.

(Efficacy)

According to this embodiment, the flow rate control unit 1 has each of the flow rate control devices 11 connected to (mounted juxtaposedly on) the manifold 2 by the joint 91 (connection means) interposed between each of the flow rate control devices 11 and the manifold 2. Also, the joint 91 has the joint adapter 71 (first pipe member), the joint adapter 81 (second pipe member) extractably coupled with the joint adapter 71, and the clip 93 that is attached to the coupling part 92 between the joint adapter 71 and the joint adapter 81 and holds the coupling part 92.

Therefore, each of the flow rate control devices 11 can be attached to or detached from the manifold 2 by manually operating (attaching/detaching) the clip 93 without using a tool, thereby allowing rationalization of assembly work in the manufacturing process, work to replace the flow rate control devices 11 at the time of maintenance, etc.

Also, because there is no need to secure space to insert a tool between the adjacent flow rate control devices 11, the mounting pitch between the adjacent flow rate control devices 11 (joints 91) can be suppressed to the minimum, allowing miniaturization of the flow rate control unit 1.

Furthermore, because the flow rate control devices 11 adjacent in the left-right direction, that is, the flow rate control devices 11 adjacent back to back are coupled by bridging the coupler 18 of one of the flow rate control devices 11 to the other flow rate control device 11, the mounting strength of the flow rate control devices 11, further the rigidity of the flow rate control unit 1 can be enhanced. In addition, it is possible to prevent the relative movement of a pair of the flow rate control devices 11 coupled by the coupler 18, having the coupler 18 function as a rotation stopper for the flow rate control devices 11. That is, it can prevent the rotation centering on the axial line L (see FIG. 3) in each of the flow rate control devices 11 mounted juxtaposedly on the manifold 2.

Also, the axial line direction length of the joint adapter 71 (H1) is different from the axial line direction length of the joint adapter 81 (H2). Especially, in this embodiment, the axial line direction length of the joint adapter 81 (H2) is set to the sum of the axial line direction length of the joint adapter 71 (H1) and the thickness of the clip 93 (H3) or greater (H2≥H1+H3). Then, the joints 91 are arranged on the manifold 2 so that the joint adapter 71 (first pipe member) and the joint adapter 81 (second pipe member) alternate between the adjacent joints 91 in the front-back and in the left-right directions, in other words, the heights of the coupling parts 92 of the joint adapter 71 and the joint adapter 81 and further the mounting heights of the clips 93 alternate between the adjacent flow rate control devices 11, thereby the operability of the clip 93 is improved, and further the assemblability and maintainability can be improved.

Also, according to this embodiment, because the impeller 42 of the flow rate measurement part 41 is manufactured by metal injection molding having a magnetic body as the material, the impeller 42 of a complex shape can be formed with high accuracy. Also, in comparison with a cutting-processed impeller, the manufacturing cost can be greatly reduced. Thereby, the rotation shaft 43 and the plurality of the wing parts 44 of the impeller 42 can be formed in one body, and in comparison with an impeller whose rotation axis 43 and plurality of wing parts 44 are separately manufactured, the number of parts can be reduced. Also, in the viewpoint of the manufacturing cost reduction, in an impeller manufactured by joining (press-fitting, bonding, etc.) its rotation shaft 43 and plurality of wing parts 44 instead of the cutting process, stricter quality control accompanying a decrease in reliability of the joined parts becomes a problem. However, the impeller 42 of this embodiment can dissolve these problems by adopting metal injection molding.

Also, according to this embodiment, adopted is the flow rate control device 11 provided with a pressure deficiency detecting function that detects pressure deficiency when the opening detecting sensor of the flow rate adjusting valve 21 has detected 100% opening degrees (full open), therefore in comparison with the conventional method that a pressure sensor is separately installed to detect a pressure abnormality based on a differential pressure measured by the pressure sensor, the manufacturing cost can be greatly reduced, and no labor or time is needed in setting (threshold values), maintenance, etc.

Also, according to this embodiment, adopted is the flow rate control device 11 provided with the valve life notifying function that notifies of the life end of the O-ring 27 by the accumulated operation amount of the flow rate adjusting valve 21 reaching the predetermined setting value, thereby allowing to prevent an external leak of the flow rate control device 11 caused by wear of the O-ring 27. Thereby, the flow rate control device 11 can be given a water-proof structure, expanding the degree of freedom in applications of the flow rate control device 11. Furthermore, because the accumulated operation amount of the flow rate adjusting valve 21 is stored in the nonvolatile memory of the controller 61, for example, even an used product can secure the function.

Also, according to this embodiment, adopted is the flow rate control device 11 provided with the flowmeter life notifying function that notifies of the life end of the flowmeter by the accumulated rotation number of the impeller 42 reaching the predetermined setting value, thereby allowing to prevent an operation failure of the impeller 42 caused by wear of the rotation shaft 43, improving the reliability of the measured values of the flow rate measurement part 41 (flowmeter), and further the reliability of the flow rate control device 11.

Also, according to this embodiment, adopted is the flow rate control device 11 provided with the internal leak notifying function that notifies of an internal leak by detecting that a fluid has flowed by a certain flow amount or greater during a certain length of time even though the flow rate adjusting valve 21 has been fully closed, thereby allowing to detect an internal leak that was conventionally difficult to judge by itself.

Also, according to this embodiment, it is made possible to recognize visually the light emission pattern of the full-color LED 68 through the optical transmission window 69 of the housing 63. Therefore, the LED 68 can be allowed to emit light in a pattern corresponding to each of the individual functions of the pressure deficiency notifying function, the valve life notifying function, the flowmeter life notifying function, and the internal leak notifying function by distinguishing them with the emitted light color difference, staying on or blinking, etc., thereby the states of plural units of the flow rate control devices 11, whether they are operating normally or not, can be grasped instantly through the one optical transmission window 69.

Note that embodiments are not limited to the one mentioned above but can be configured in the following manner for example.

Although explained in the above-mentioned embodiment was the flow rate control device 11 that adopted an impeller (turbine) type flowmeter, the flow rate control device 11 can adopt, for example, a Karman vortex flowmeter, an electromagnetic flowmeter, an ultrasonic flowmeter, a differential pressure flowmeter, a Coriolis flowmeter, a thermal flowmeter, etc.

Also, although explained in the above-mentioned embodiment was the flow rate control device 11 provided with the flow rate adjusting valve 21 that adopted a ball valve, the flow rate adjusting valve 21 can adopt a needle valve, a globe valve, a gate valve, a butterfly valve, etc.

LEGEND

11: Flow rate control device
13: Flow path
21: Flow rate adjusting valve
24: Motor actuator
241, 242, 243: Gears
244: Magnet
245: Board
246: Limit sensor (opening detecting sensor)|
247: Motor
41: Flow rate measurement part
42: Impeller
61: Controller
68: LED (full-color)

What is claimed is:

1. A flow rate control device, comprising:
 a flow rate adjusting valve that is installed in a flow path, wherein the flow rate adjusting valve has an opening through which a fluid flows,
 a flow rate measurement part that measures a flow rate of the fluid flowing through the flow path,
 a controller that controls opening degrees of the flow rate adjusting valve based on a measurement result of the flow rate measurement part, and
 a pressure deficiency detecting function that detects pressure deficiency when an opening detecting sensor that detects the opening degrees of the flow rate adjusting valve detects the opening are fully opened.

2. The flow rate control device according to claim 1, further comprising:
 a valve life notifying function that notifies of a life end of the flow rate adjusting valve when an accumulated operation amount of the flow rate adjusting valve has reached a predetermined setting value.

3. The flow rate control device according to claim 1, further comprising:
 an internal leak notifying function that notifies of a leak of a liquid inside the flow rate adjusting valve when a flow amount is a predetermined setting value or greater even though the opening of the flow rate adjusting valve has been fully closed.

4. The flow rate control device according to claim 2, further comprising:
an internal leak notifying function that notifies of a leak of a liquid inside the flow rate adjusting valve when a flow amount is a predetermined setting value or greater even though the opening of the flow rate adjusting valve has been fully closed.

5. The flow rate control device according to claim 1, further comprising
a flowmeter life notifying function that notifies of a life end of the flow rate measurement part when an accumulated rotation number of an impeller in the flow rate measurement part has reached a predetermined setting value.

6. The flow rate control device according to claim 1, further comprising: an LED that emits light in a pattern corresponding to each of individual functions of the pressure deficiency detecting function, a valve life notifying function, an internal leak notifying function, and a flowmeter life notifying function.

\* \* \* \* \*